United States Patent
Akiyama et al.

(10) Patent No.: US 11,494,602 B2
(45) Date of Patent: Nov. 8, 2022

(54) IMAGE FORMING APPARATUS

(71) Applicants: Takuya Akiyama, Kanagawa (JP);
Seiichi Kogure, Kanagawa (JP);
Atsushi Nakamoto, Kanagawa (JP);
Daisuke Hamada, Kanagawa (JP);
Yuuki Aoki, Tokyo (JP); Yutaka Goto,
Kanagawa (JP)

(72) Inventors: Takuya Akiyama, Kanagawa (JP);
Seiichi Kogure, Kanagawa (JP);
Atsushi Nakamoto, Kanagawa (JP);
Daisuke Hamada, Kanagawa (JP);
Yuuki Aoki, Tokyo (JP); Yutaka Goto,
Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/399,060

(22) Filed: Aug. 11, 2021

(65) Prior Publication Data

US 2022/0083828 A1    Mar. 17, 2022

(30) Foreign Application Priority Data

Sep. 15, 2020    (JP) .............................. JP2020-154573
Jun. 18, 2021    (JP) .............................. JP2021-101989

(51) Int. Cl.
*G06K 15/00*    (2006.01)
*H04N 1/00*    (2006.01)
(Continued)

(52) U.S. Cl.
CPC ....... *G06K 15/408* (2013.01); *G06K 15/1822* (2013.01); *G06K 15/407* (2013.01);
(Continued)

(58) Field of Classification Search
CPC ............. G06K 15/408; G06K 15/1822; G06K 15/407; H04N 1/00005; H04N 1/00037; H04N 1/393; H04N 2201/0094
See application file for complete search history.

(56) References Cited

U.S. PATENT DOCUMENTS

| 2009/0052917 A1 | 2/2009 | Kogure et al. |
| 2010/0021192 A1 | 1/2010 | Kogure et al. |

(Continued)

FOREIGN PATENT DOCUMENTS

| JP | 1124360 A | * | 7/1997 |
| JP | 2005043816 A | * | 2/2005 |

(Continued)

OTHER PUBLICATIONS

U.S. Appl. No. 17/226,156, filed Apr. 9, 2021, Atsushi Nakamoto, et al.

*Primary Examiner* — Huo Long Chen
(74) *Attorney, Agent, or Firm* — Xsensus LLP

(57) ABSTRACT

An image forming apparatus includes a rotatable image bearer, a transfer rotator, a detector, and circuitry. The image bearer bears an image. The transfer rotator transfers the image from the image bearer onto a recording medium sandwiched and conveyed between the image bearer and the transfer rotator. The detector detects length information indicating a length, in a direction of conveyance of the recording medium, of the image on the recording medium. The circuitry corrects a correction value, based on the length information detected by the detector and a target value of the length information, to correct an image magnification, in the direction of conveyance of the recording medium, of the image to be formed on the recording medium. The circuitry controls an image forming operation of forming the image on the recording medium with the correction value.

11 Claims, 7 Drawing Sheets

(51) Int. Cl.
   *G06K 15/02*   (2006.01)
   *H04N 1/393*   (2006.01)
(52) U.S. Cl.
   CPC ..... *H04N 1/00005* (2013.01); *H04N 1/00037* (2013.01); *H04N 1/393* (2013.01); *H04N 2201/0094* (2013.01)

(56) References Cited

U.S. PATENT DOCUMENTS

| | | |
|---|---|---|
| 2011/0058859 A1 | 3/2011 | Nakamatsu et al. |
| 2011/0129262 A1 | 6/2011 | Nakamoto |
| 2011/0211855 A1 | 9/2011 | Kogure et al. |
| 2011/0217085 A1 | 9/2011 | Hattori et al. |
| 2012/0163874 A1 | 6/2012 | Hattori et al. |
| 2012/0219326 A1 | 8/2012 | Koike et al. |
| 2013/0034368 A1 | 2/2013 | Hattori et al. |
| 2013/0216260 A1 | 8/2013 | Kogure et al. |
| 2014/0241744 A1 | 8/2014 | Ichikawa et al. |
| 2014/0321874 A1 | 10/2014 | Sugiura et al. |
| 2014/0376951 A1 | 12/2014 | Ogawa et al. |
| 2015/0023700 A1 | 1/2015 | Nakamoto et al. |
| 2015/0037054 A1 | 2/2015 | Nagata et al. |
| 2015/0055981 A1 | 2/2015 | Fujita et al. |
| 2015/0063875 A1 | 3/2015 | Ohshima et al. |
| 2015/0147074 A1 | 5/2015 | Wada et al. |
| 2015/0205248 A1 | 7/2015 | Yogosawa et al. |
| 2015/0212454 A1 | 7/2015 | Ichikawa et al. |
| 2015/0248107 A1 | 9/2015 | Hamada et al. |
| 2015/0261134 A1 | 9/2015 | Kikuchi et al. |
| 2015/0261137 A1 | 9/2015 | Mitani et al. |
| 2015/0268591 A1 | 9/2015 | Fujita et al. |
| 2015/0378284 A1 | 12/2015 | Wada et al. |
| 2016/0033915 A1 | 2/2016 | Kumagai et al. |
| 2016/0041508 A1 * | 2/2016 | Kogure ............... G03G 15/1665 399/316 |
| 2016/0109832 A1 | 4/2016 | Ohsugi et al. |
| 2016/0124374 A1 | 5/2016 | Yogosawa et al. |
| 2016/0131991 A1 * | 5/2016 | Yoshida ............. G03G 15/5058 399/49 |
| 2016/0161887 A1 | 6/2016 | Sugiura et al. |
| 2016/0161888 A1 | 6/2016 | Wada et al. |
| 2016/0170363 A1 | 6/2016 | Kogure et al. |
| 2016/0170364 A1 | 6/2016 | Kogure et al. |
| 2016/0170365 A1 | 6/2016 | Mitani et al. |
| 2016/0195846 A1 | 7/2016 | Koshizuka et al. |
| 2016/0216647 A1 | 7/2016 | Yogosawa et al. |
| 2016/0216682 A1 | 7/2016 | Sengoku et al. |
| 2016/0274503 A1 | 9/2016 | Sugiura et al. |
| 2016/0274504 A1 | 9/2016 | Wada et al. |
| 2016/0274505 A1 | 9/2016 | Ohsugi et al. |
| 2016/0306300 A1 | 10/2016 | Hamada et al. |
| 2016/0306317 A1 | 10/2016 | Wada et al. |
| 2016/0334739 A1 | 11/2016 | Ohsugi et al. |
| 2016/0342134 A1 | 11/2016 | Shiori et al. |
| 2017/0003630 A1 | 1/2017 | Ohsugi et al. |
| 2017/0031310 A1 | 2/2017 | Kichise et al. |
| 2017/0090374 A1 | 3/2017 | Fujita et al. |
| 2017/0097589 A1 | 4/2017 | Seki et al. |
| 2017/0115597 A1 | 4/2017 | Kawashima et al. |
| 2017/0139353 A1 | 5/2017 | Sakashita et al. |
| 2017/0168418 A1 | 6/2017 | Takami et al. |
| 2017/0168421 A1 | 6/2017 | Koshizuka et al. |
| 2017/0212449 A1 | 7/2017 | Kuboki et al. |
| 2017/0235257 A1 | 8/2017 | Kochi et al. |
| 2017/0235258 A1 | 8/2017 | Wada et al. |
| 2017/0242371 A1 | 8/2017 | Kogure et al. |
| 2017/0329263 A1 | 11/2017 | Sugiura et al. |
| 2017/0336733 A1 | 11/2017 | Adachi et al. |
| 2017/0351195 A1 | 12/2017 | Koshizuka et al. |
| 2018/0046115 A1 | 2/2018 | Fujita et al. |
| 2018/0059583 A1 | 3/2018 | Kumagai et al. |
| 2018/0059595 A1 | 3/2018 | Akiyama et al. |
| 2018/0143570 A1 * | 5/2018 | Mizutani ............... G03G 15/161 |
| 2018/0157196 A1 | 6/2018 | Kogure et al. |
| 2018/0157209 A1 | 6/2018 | Fujita et al. |
| 2018/0341201 A1 | 11/2018 | Kogure et al. |
| 2019/0171137 A1 | 6/2019 | Kobayashi |
| 2019/0171154 A1 | 6/2019 | Kobayashi et al. |
| 2021/0063919 A1 | 3/2021 | Nakamoto et al. |
| 2021/0223721 A1 | 7/2021 | Goto et al. |

FOREIGN PATENT DOCUMENTS

| | | | | |
|---|---|---|---|---|
| JP | 2010-266624 | 11/2010 | | |
| JP | 2017-107101 | 6/2017 | | |
| JP | 2018-124455 | 8/2018 | | |
| JP | 2018124455 A * | 8/2018 | ......... G03G 15/5041 |
| JP | 2019-028197 | 2/2019 | | |
| JP | 2019-098734 | 6/2019 | | |
| JP | 2019-101326 | 6/2019 | | |
| JP | 2019-159034 | 9/2019 | | |

* cited by examiner

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2020-154573, filed on Sep. 15, 2020, and 2021-101989, filed on Jun. 18, 2021, in the Japan Patent Office, the entire disclosure of each of which is hereby incorporated by reference herein.

BACKGROUND

Technical Field

Embodiments of the present disclosure relate to an image forming apparatus for forming an image on a recording medium.

Related Art

Various types of image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly or indirectly via an intermediate transfer belt. Finally, a fixing device applies heat and pressure to the recording medium bearing the toner image to fix the toner image onto the recording medium. Thus, an image is formed on the recording medium.

Such image forming apparatuses may detect, with a line sensor, a position detection mark formed on a recording medium to correct an image position on a recording medium.

SUMMARY

In one embodiment of the present disclosure, a novel image forming apparatus includes a rotatable image bearer, a transfer rotator, a detector, and circuitry. The image bearer bears an image. The transfer rotator transfers the image from the image bearer onto a recording medium sandwiched and conveyed between the image bearer and the transfer rotator. The detector detects length information indicating a length, in a direction of conveyance of the recording medium, of the image on the recording medium. The circuitry corrects a correction value, based on the length information detected by the detector and a target value of the length information, to correct an image magnification, in the direction of conveyance of the recording medium, of the image to be formed on the recording medium. The circuitry controls an image forming operation of forming the image on the recording medium with the correction value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
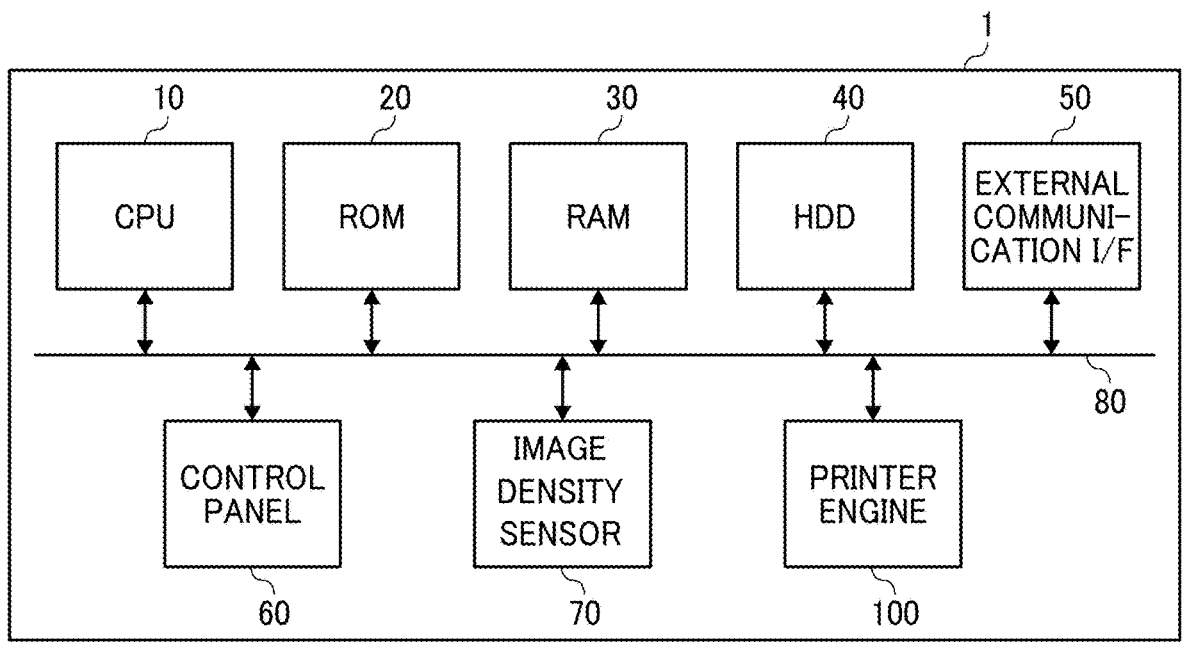
FIG. 1 is a block diagram illustrating a hardware configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIG. 1, a description is given of a configuration of an image forming apparatus 1 according to an embodiment of the present disclosure.

FIG. 1 is a block diagram illustrating a hardware configuration of the image forming apparatus 1 according to the present embodiment.

As illustrated in FIG. 1, the image forming apparatus 1 of the present embodiment includes a central processing unit (CPU) 10 serving as a control unit or a correction unit, a read only memory (ROM) 20, a random access memory (RAM) 30, a hard disk drive (HDD) 40, an external communication interface (I/F) 50, a control panel 60, an image density sensor 70, and a printer engine 100. The image forming apparatus 1 further includes a system bus 80 that connects the CPU 10, the ROM 20, the RAM 30, the HDD 40, the external communication I/F 50, the control panel 60, the image density sensor 70, and the printer engine 100 to each other.

The CPU 10 controls the operation of the image forming apparatus 1. Specifically, the CPU 10 loads programs stored in the ROM 20 or the HDD 40 onto the RAM 30 as a work area, to execute the programs to control the operation of the image forming apparatus 1 as a whole such that the image forming apparatus 1 implements various functions such as copying, scanning, facsimile, and printing functions.

The ROM 20 is a nonvolatile semiconductor memory that is capable of retaining data even after the power is turned off. The RAM 30 is a volatile semiconductor memory that temporarily stores programs and data. The HDD 40 is a nonvolatile memory storing programs and data. Examples of the programs stored in the HDD 40 include, but are not limited to, an operating system (OS), as basic software for controlling the operation of the image forming apparatus 1 as a whole, various application programs that function on the OS, data for setting, e.g., operating conditions for the copying, scanning, facsimile, and printing functions.

The external communication I/F 50 is an interface that connects the image forming apparatus 1 to a network such as the Internet or a local area network (LAN). The image forming apparatus 1 receives, e.g., a print instruction and image data from an external device via the external communication I/F 50.

The control panel 60 receives various inputs according to operations by, e.g., a user on one hand. On the other hand, the control panel 60 displays various types of information such as information indicating an operation received, information indicating an operating status of the image forming apparatus 1, and information indicating a current configuration of the image forming apparatus 1. In the present example, the control panel 60 is a liquid crystal display (LCD) having a touch panel function. However, the control panel 60 is not limited to such an LCD. Alternatively, for example, the control panel 60 may be an organic electroluminescence (EL) display having a touch panel function. In alternative to or in addition to the LCD or the EL display, the control panel 60 may include an operation device such as hardware keys and/or a display such as an indicator lamp. The control panel 60 is controlled by the CPU 10.

The printer engine 100 is a hardware component that implements an image forming operation. In the present example, the printer engine 100 forms an image by electrophotography. The printer engine 100 is controlled by the CPU 10.

The image forming apparatus 1 may include specific optional devices such as a finisher that sorts printed sheets (i.e., printed recording media) and an automatic document feeder (ADF) that automatically feeds a document.

The image forming apparatus 1 may further include an external interface to read or write data from or to an external storage medium such as a compact disk (CD), a digital versatile disk (DVD), a secure digital (SD) memory card, or a universal serial bus (USB) memory via the external interface.

Note that the programs stored in the ROM 20 or the HDD 40 are processable by a computer. The programs may be installed in the ROM 20 or the HDD 40 at the time of manufacturing or shipping of the image forming apparatus 1. Alternatively, the programs may be installed in the ROM 20 or the HDD 40 after the sale of the image forming apparatus 1. In this case, the programs may be installed in the ROM 20 or the HDD 40 via an external storage medium drive from an external storage medium storing the programs or program code. Alternatively, the programs may be installed in the ROM 20 or the HDD 40 via the network, with the external communication I/F 50.

Figure 2:
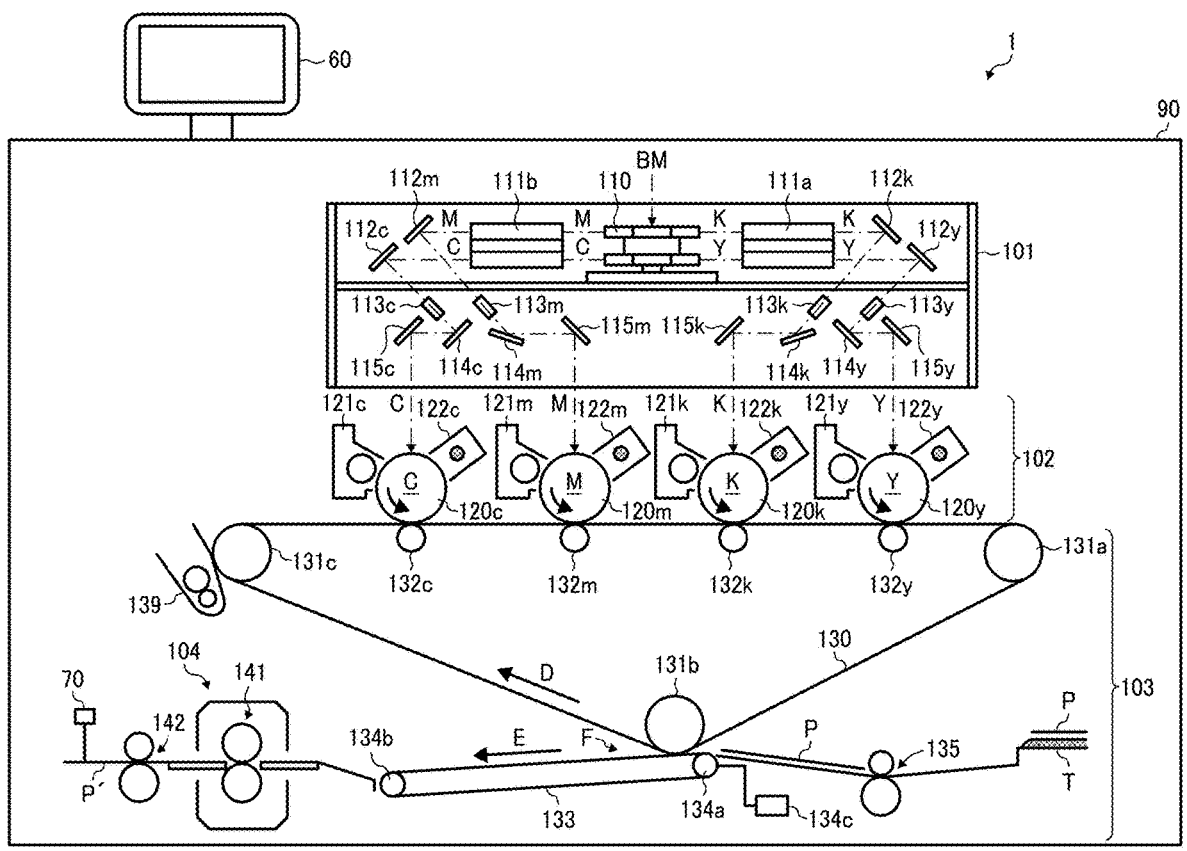
FIG. 2 is a diagram illustrating a hardware configuration of a printer engine of the image forming apparatus of FIG. 1.

FIG. 2 is a diagram illustrating a hardware configuration of the printer engine 100.

FIG. 2 illustrates the control panel 60 and the image density sensor 70 for the sake of description.

The printer engine 100 is disposed in a housing 90 of the image forming apparatus 1. The printer engine 100 includes an exposure device 101, an image forming device 102, a transfer device 103, and a fixing device 104. The control panel 60 is disposed atop the housing 90.

The image forming device 102 includes photoconductors 120y, 120k, 120m, and 120c serving as latent image bearers for yellow (Y), black (K), magenta (M), and cyan (C), respectively. The image forming device 102 further includes developing devices 121y, 121k, 121m, and 121c for yellow (Y), black (K), magenta (M), and cyan (C), respectively. The image forming device 102 further includes chargers 122y, 122k, 122m, and 122c for yellow (Y), black (K), magenta (M), and cyan (C), respectively.

The transfer device 103 includes, e.g., an intermediate transfer belt 130 serving as an image bearer and an intermediate transferor and a secondary transfer belt 133 serving as a transfer rotator. The fixing device 104 includes, e.g., a fixing rotator 141 and an output roller 142.

With continued reference to FIG. 2, a description is given of the operation of the printer engine 100.

The exposure device 101 exposes the photoconductors 120y, 120k, 120m, and 120c of the image forming device 102. In other words, the exposure device 101 emits writing light to write a latent image onto each of the photoconductors 120y, 120k, 120m, and 120c according to image data. Specifically, the exposure device 101 selectively emits a light beam, by a writing light amount corresponding to the image density, to a write position according to an image pattern of the image data. The writing light is, e.g., light from a laser light source or a light emitting diode (LED) light source. In the present example, a laser light source including laser diodes (LDs) emits the writing light.

Now, a detailed description is given of the operation of the exposure device 101 that emits a light beam BM from the laser light source. The light beam BM emitted from the laser light source is deflected by a polygon mirror 110 and strikes scanning lenses 111a or 111b each including an fθ lens. Specifically, the light beam BM corresponding to yellow (Y), black (K), magenta (M), and cyan (C) color images in number is generated as light beams YKMC, namely, a yellow light beam Y, a black light beam K, a magenta light beam M, and a cyan light beam C. After passing through the scanning lenses 111a or 111b, the light beams YKMC are reflected by the corresponding reflection mirrors 112y, 112k, 112m, and 112c. For example, the yellow light beam Y passes through the scanning lens 111a and is reflected by the reflection mirror 112y to strike a WTL lens 113y. Similarly, the black light beam K passes through the scanning lens 111a and is reflected by the reflection mirror 112k to strike a WTL lens 113k. On the other hand, the magenta light beam M and the cyan light beam C pass through the scanning lens 111b and are reflected by the reflection mirrors 112m and 112c to strike WTL lenses 113m and 113c, respectively.

The WTL lenses 113y, 113k, 113m, and 113c shape the incident light beams YKMC, respectively. Thereafter, the WTL lenses 113y, 113k, 113m, and 113c deflect the light beams YKMC to reflection mirrors 114y, 114k, 114m, and 114c, respectively. The light beams YKMC reflected by the reflection mirrors 114y, 114k, 114m, and 114c are further reflected by reflection mirrors 115y, 115k, 115m, and 115c to finally reach the photoconductors 120y, 120k, 120m, and 120c, respectively. Thus, the exposure device 101 exposes or irradiates the photoconductors 120y, 120k, 120m, and 120c with the light beams YKMC, respectively. Specifically, the exposure device 101 irradiates the photoconductors 120y, 120k, 120m, and 120c with the light beams YKMC in a main scanning direction and a sub-scanning direction with respect to the photoconductors 120y, 120k, 120m, and 120c in synchronized timing. The main scanning direction with respect to the photoconductors 120y, 120k, 120m, and 120c is herein defined as a scanning direction of the light beams YKMC; whereas the sub-scanning direction is herein defined as a direction perpendicular to the main scanning direction, in other words, as a direction in which the photoconductors 120y, 120k, 120m, and 120c rotate.

The photoconductors 120y, 120k, 120m, and 120c are, e.g., drum-shaped photoconductors elongated in the main scanning direction and may be referred to as photoconductor drums. Each of the photoconductors 120y, 120k, 120m, and 120c of the present embodiment includes, on a conductive drum made of, e.g., aluminum, a photoconductive layer including at least a charge generation layer and a charge transport layer. The chargers 122y, 122k, 122m, and 122c each including a corotron or scorotron charger or a charging roller apply a charging bias to charge the surface of the photoconductive layer of the photoconductors 120y, 120k, 120m, and 120c, respectively.

According to the yellow, black, magenta, and cyan image patterns, the exposure device 101 irradiates, with the light beams YKMC as writing light, the surface of the photoconductors 120y, 120k, 120m, and 120c respectively charged by the 122y, 122k, 122m, and 122c to a given electric potential. As the electric potential changes at the exposed portion, an electrostatic latent image is formed on each of the photoconductors 120y, 120k, 120m, and 120c. The developing devices 121y, 121k, 121m, and 121c including, e.g., a regulation blade, a toner supply roller, and a developing sleeve supplied with a developing bias develop the electrostatic latent images thus formed on the photoconductors 120y, 120k, 120m, and 120c, respectively. Thus, the developing devices 121y, 121k, 121m, and 121c from toners images on the surface of the photoconductors 120y, 120k, 120m, and 120c, respectively.

The toner images borne on the respective surfaces of the photoconductors 120y, 120k, 120m, and 120c are superimposed one atop another on the intermediate transfer belt 130 serving as an image bearer and rotated in a direction D (i.e., direction indicated by arrow D in FIG. 2) by conveyance rollers 131a, 131b, and 131c around which the intermediate transfer belt 130 is entrained. Thus, the toner images are transferred from the photoconductors 120y, 120k, 120m, and 120c onto the intermediate transfer belt 130. Primary transfer rollers 132y, 132k, 132m, and 132c are disposed facing the photoconductors 120y, 120k, 120m, and 120c, respectively, and stretching the intermediate transfer belt 130. The intermediate transfer belt 130 bearing the toner images of Y, K, M, and C transferred from the surface of the photoconductors 120y, 120k, 120m, and 120c, respectively, is conveyed to a secondary transfer area F, which may be referred to as a secondary transfer nip.

The secondary transfer belt 133 is entrained around a drive roller 134a and a conveyance roller 134b. As the drive roller 134a and the conveyance roller 134b rotate, the secondary transfer belt 133 is rotated in a direction E (i.e., direction indicated by arrow E in FIG. 2). A registration roller pair 135 supplies, from a sheet container T such as an input tray, a sheet P serving as a recording medium to the secondary transfer area F. Examples of the sheet P include, but are not limited to, fine paper and a plastic sheet. A secondary transfer bias is applied at the secondary transfer area F to transfer the toner images borne on the intermediate transfer belt 130 as a composite toner image onto the sheet P attracted and held on the secondary transfer belt 133. The sheet P is conveyed in a direction perpendicular to the main scanning direction. In other words, the sheet P is conveyed in the sub-scanning direction. The direction in which the sheet P is conveyed may be referred to as a sheet conveying direction or a direction of conveyance of a recording medium.

The secondary transfer belt 133 conveys the sheet P to the fixing device 104. The fixing device 104 includes a fixing rotator 141 such as a fixing roller including, e.g., silicone rubber or fluorine rubber. The fixing device 104 fixes the composite toner image onto the sheet P under heat and pressure. The output roller 142 ejects, as a sheet P', the sheet P bearing the fixing toner image to the outside of the fixing device 104.

The image density sensor 70 detects the image density of the image on the sheet P' ejected from the fixing device 104. A detailed description of the image density sensor 70 is deferred. The image density detected by the image density sensor 70 is used for correction of image density deviation in the main scanning direction and the sub-scanning direction. In the present embodiment, as described later, the image density is used for detection of length information indicating a length, in the sub-scanning direction (i.e., the sheet conveying direction) of the image formed on the sheet P'.

After the composite toner image is transferred, a cleaning device 139 including a cleaning blade removes, from the intermediate transfer belt 130, residual toner that has failed to be transferred onto the sheet P and therefore remains on the intermediate transfer belt 130. Thus, the intermediate transfer belt 130 is ready for the next image forming process.

In the operation of the printer engine 100 described above, the direction of rotation of the photoconductors 120y, 120k, 120m, and 120c, the direction of rotation of the intermediate transfer belt 130, and the direction of conveyance of the sheets P and P' are all perpendicular to the main scanning direction and parallel to the sub-scanning direction.

In FIG. 2, the image density sensor 70 is disposed downstream from the fixing device 104 in the sheet conveying direction. Alternatively, the image density sensor 70 may be disposed near the conveyance roller 131a to detect the image of an image formed on the intermediate transfer belt 130.

Figure 3:
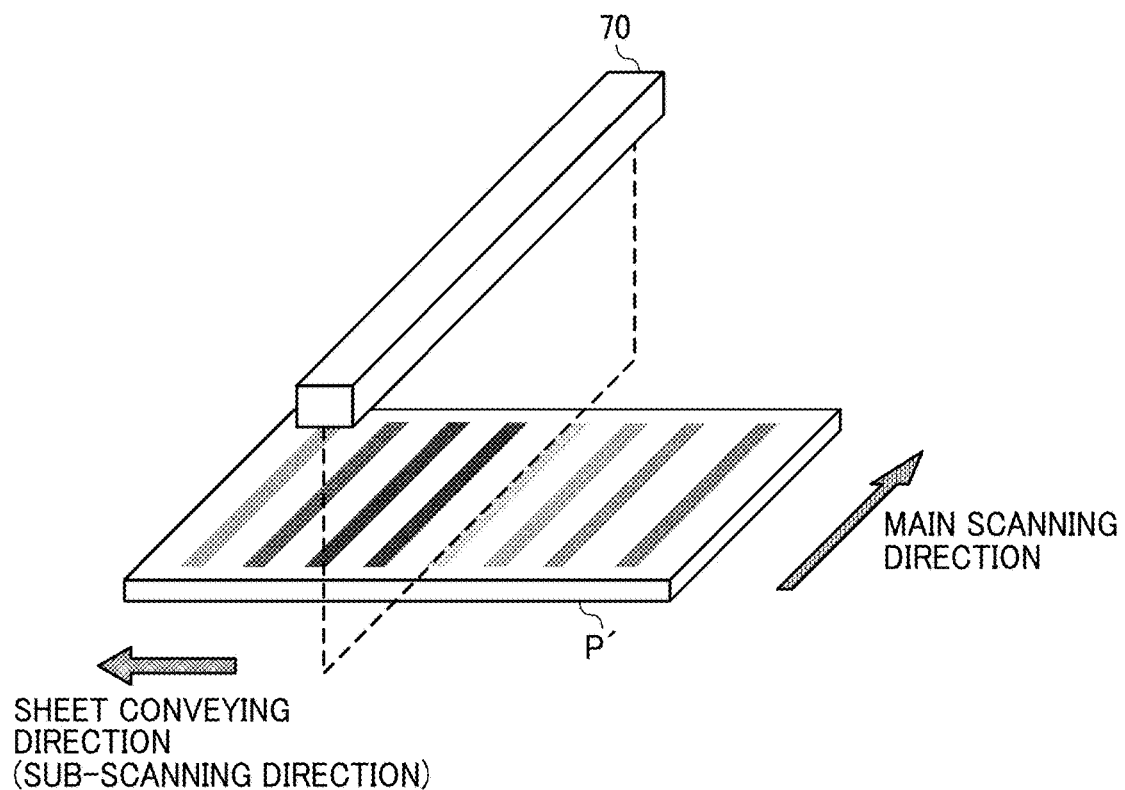
FIG. 3 is a perspective view of an image density sensor of the image forming apparatus of FIG. 1.

Referring now to FIG. 3, a description is given of a configuration of the image density sensor 70.

FIG. 3 is a perspective view of the image density sensor 70.

The image density sensor 70 has a long shape in the main scanning direction. Since the image density sensor 70 includes an image element elongated in the main scanning direction, the image density sensor 70 may be referred to as a line sensor. FIG. 3 illustrates a width indicated by a dotted line in the main scanning direction as a detection width of the image density sensor 70 in the main scanning direction. The detection width is greater than the width of the sheet P' in the main scanning direction. When the sheet P' is conveyed so as to pass through the width indicated by the dotted line in the main scanning direction in FIG. 3, the image density sensor 70 detects the image density over the entire area in the main scanning direction of the sheet P'.

In the present embodiment, the image density sensor 70 continuously detects the image density to detect the density in the sub-scanning direction of an image on the sheet P'. In the present embodiment, the detection result is used for detection of the length in the sub-scanning direction of the image on the sheet P'. The length in the sub-scanning direction of the image on the sheet P' is defined as a distance in the sub-scanning direction between two given points in the image on the sheet P'. The two points may be specified as appropriate. For example, the two points may be the first dot and the last dot in the sub-scanning direction of the image formed on the sheet P'. Alternatively, the two points may be two pattern images (e.g., detection marks for image positioning) formed at given positions in the image formed on the sheet P'.

In the present embodiment, the image density sensor 70 detects the fixed image on the sheet P'. However, the image detected by the image density sensor 70 is not limited to such a fixed image. For example, the image density sensor 70 may detect an unfixed image formed on a recording medium, in other words, an image to be fixed onto the recording medium, provided that the image density sensor 70 detects the length in the sub-scanning direction of an image formed on a recoding medium (i.e., a secondarily transferred image).

Figure 4:
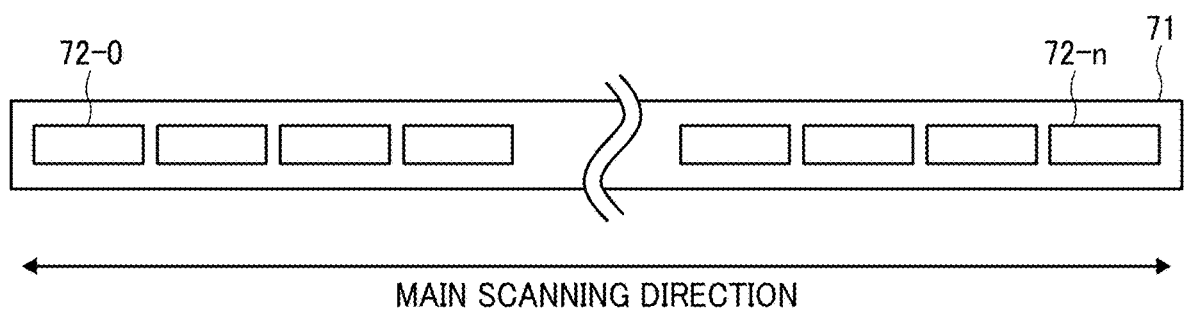
FIG. 4 is a schematic diagram illustrating an internal structure of the image density sensor of FIG. 3 as viewed in a direction perpendicular to a main scanning direction.

FIG. 4 is a schematic diagram illustrating an internal structure of the image density sensor 70 as viewed in a direction perpendicular to the main scanning direction.

As illustrated in FIG. 4, the image density sensor 70 includes an image element 71. The image density sensor 70 further includes a light source, a lens array, and an output circuit.

The light source may include a light guide having an end provided with a light emitting device. Alternatively, the light source may be an LED array. The light emitted from the light source is reflected on the sheet P' and imaged on the image element 71 by a lens array. The image element 71 receives the light imaged by the lens array with light receiving elements 72 (illustrated as light receiving elements 72-0 to 72-n in FIG. 4). The image element 71 then outputs a signal corresponding to the amount of the light received. The image element 71 may be, e.g., a complementary metal oxide semiconductor (CMOS) sensor or a charge-coupled device (CCD) sensor.

The output circuit converts the signal from the light receiving elements 72 disposed on the image element 71 into data indicating the image density for each position in the main scanning direction of the image formed on the sheet P'. The output circuit then outputs the data. The output signal is, e.g., image density data in 0 to 255 tones represented by 8 bits. The output circuit may be, e.g., an application-specific integrated circuit (ASIC).

Figure 5:
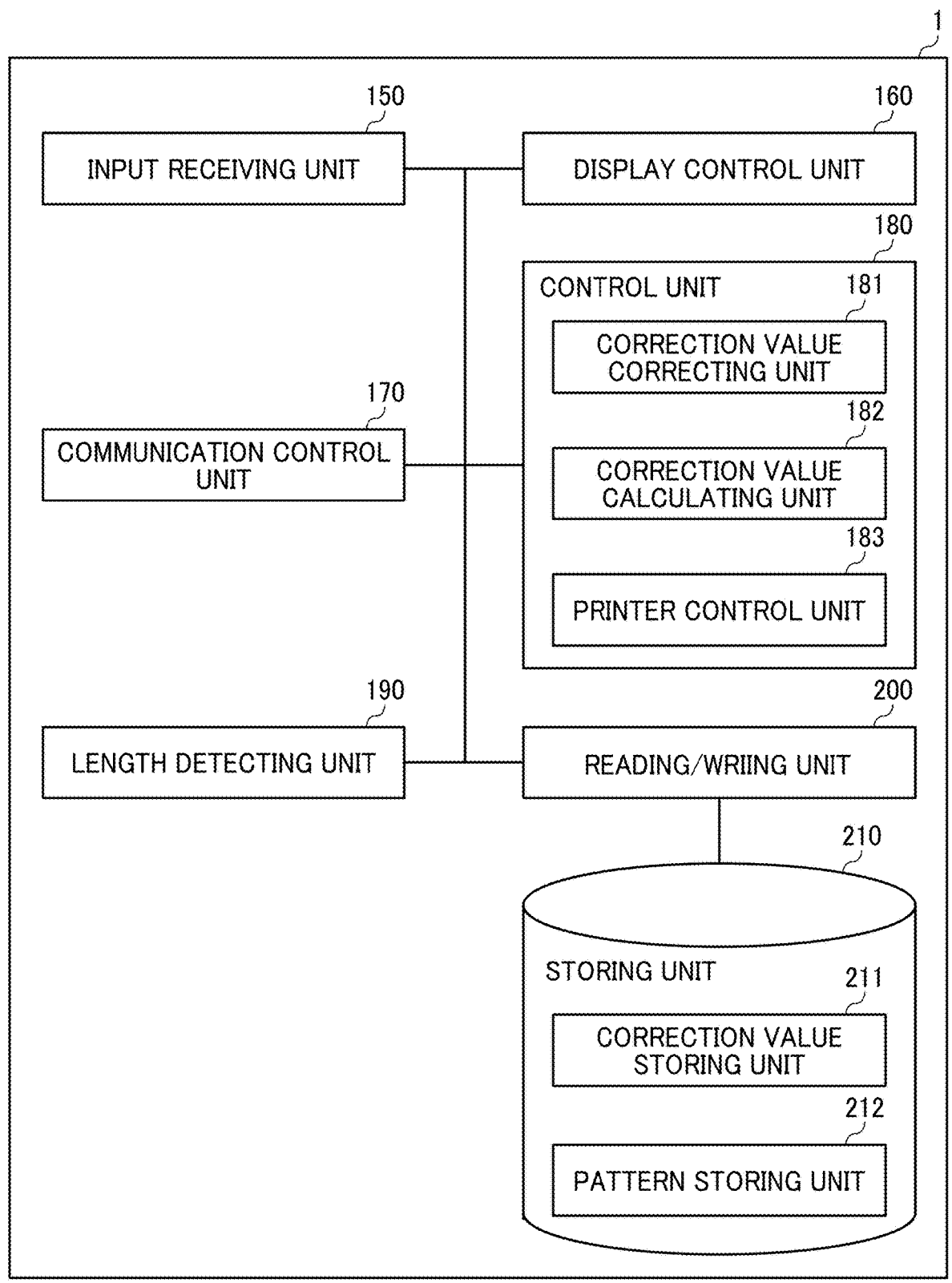
FIG. 5 is a functional block diagram of the image forming apparatus of FIG. 1.

FIG. 5 is a functional block diagram of the image forming apparatus 1, illustrating functional units of the image forming apparatus 1.

Specifically, an input receiving unit 150 is implemented by the control panel 60. The input receiving unit 150 displays information that is used for operation to, e.g., a user and receives various inputs from the user. The input receiving unit 150 is also implemented by the processing of the external communication I/F 50. The input receiving unit 150 receives a request from a user, such as a print instruction or a configuration change, input from an external device via a local area network (LAN) or the Internet.

A display control unit 160 is implemented by the CPU 10 executing a program loaded from the ROM 20 or the HDD 40 onto the RAM 30 as a work area. The display control unit 160 controls a display on a screen of the input receiving unit 150.

A communication control unit 170 is implemented by the processing of the external communication I/F 50. The communication control unit 170 transmits image information to an external device via an e-mail, for example. When setting is available by an external device, the communication control unit 170 communicates with the external device via the network to receive setting information.

The control unit 180 is implemented by the CPU 10 executing a program loaded from the ROM 20 or the HDD 40 onto the RAM 30 as a work area. The control unit 180 executes functions of the entire image forming apparatus 1 such as the copying, scanning, printing, and facsimile functions. The control unit 180 includes a correction value correcting unit 181, a correction value calculating unit 182, and a printer control unit 183. The correction value correcting unit 181 corrects a correction value stored in the storing unit 210. The correction value calculating unit 182 calculates correction values of image forming conditions for correcting various types of image quality degradation including an error in image magnification in the sub-scanning direction. The printer control unit 183 controls the printer engine 100 in particular.

A length detecting unit 190 is implemented by the image density sensor 70. The length detecting unit 190 detects and outputs the length in the sub-scanning direction of an image formed on a recording medium by the printer engine 100.

A reading/writing unit 200 is implemented by the CPU 10 executing a program loaded from the ROM 20 or the HDD 40 onto the RAM 30 as a work area. The reading/writing unit 200 stores various types of data in the storing unit 210 and retrieves the various types of data from the storing unit 210.

The storing unit 210 is implemented by the ROM 20 or the HDD 40. The storing unit 210 stores, e.g., programs, data, various types of setting information on the image forming conditions for the operation of the image forming apparatus 1 (e.g., correction value information), and operation logs of the image forming apparatus 1. Examples of the image forming conditions include, but are not limited to, a charging bias, a developing bias, an amount of optical writing light, and a transfer bias. The storing unit 210 includes a correction value storing unit 211 and a pattern storing unit 212.

The correction value storing unit 211 stores correction values of various image forming conditions. In particular, in the present embodiment, the correction value storing unit 211 stores a correction value for correcting a linear velocity of the secondary transfer belt 133, in other words, the number of rotations of the drive roller 134a that rotates the secondary transfer belt 133. In the present embodiment, the correction value is stored in the form of a correction table indicating the correlation between the correction value of the linear velocity of the secondary transfer belt 133 and toner adhesion amount information relating to an amount of toner adhering per unit area of an image that is formed on a recording medium. In the present embodiment, the toner adhesion amount information is referred t0 as information of the image area rate. Alternatively, for example, the correction value may be calculated according to calculation information (e.g., calculation formula) stored for calculating the correction value from the toner adhesion amount information (i.e., the information of the image area rate in the present embodiment) of an image that is formed on a recording medium.

Various types of information stored in the storing unit 210 may be set before or updated after the shipment of the image forming apparatus 1. Depending on the information that is stored, the storing unit 210 may be implemented by a temporary storage function of the RAM 30.

In the present embodiment, the printer engine 100 includes the intermediate transfer belt 130 as a rotatable image bearer and the secondary transfer belt 133 as a transfer rotator. While a sheet P serving as a recording medium is sandwiched and conveyed between the intermediate transfer belt 130 and the secondary transfer belt 133, a toner image is transferred from the intermediate transfer belt 130 onto the sheet P. Thus, the printer engine 100 forms an image on the sheet P.

The printer engine 100 of the present embodiment includes an adjuster that adjusts a relative difference in linear velocity (i.e., difference in rotational speed) between the intermediate transfer belt 130 and the secondary transfer belt 133 at the secondary transfer nip (as a transfer nip). In alternative to or in addition to the adjuster, the printer engine 100 of the present embodiment may include another adjuster that adjusts the contact pressure between the intermediate transfer belt 130 and the secondary transfer belt 133 at the secondary transfer nip. Such an adjuster or adjusters allow the printer engine 100 to adjust the conveyance speed of a recording medium passing through the secondary transfer nip without changing the process speed (i.e., the linear velocity or rotational speed of the intermediate transfer belt 130).

As the adjuster that adjusts the relative difference in linear velocity between the intermediate transfer belt 130 and the secondary transfer belt 133 at the secondary transfer nip, the printer engine 100 of the present embodiment includes a motor 134c (illustrated in FIG. 2) that adjusts the number of rotations of the drive roller 134a that drives and rotates the secondary transfer belt 133. The motor 134c is a motor that can vary the number of rotations. The printer control unit 183 of the control unit 180 controls the motor 134c. As the number of rotations of the drive roller 134a is adjusted, the rotational speed of the secondary transfer belt 133 is adjusted, resulting in adjustment of the difference in linear velocity between the intermediate transfer belt 130 and the secondary transfer belt 133 at the secondary transfer nip. In other words, the linear velocity of the secondary transfer belt 133 relative to the intermediate transfer belt 130 at the secondary transfer nip is adjusted.

As the adjuster that adjusts the contact pressure between the intermediate transfer belt 130 and the secondary transfer belt 133 at the secondary transfer nip, the printer engine 100 of the present embodiment may include, e.g., a moving assembly such as a cam assembly that moves the drive roller 134a to or away from the intermediate transfer belt 130. As the printer control unit 183 of the control unit 180 controls the moving assembly to adjust the position of the drive roller 134a relative to the intermediate transfer belt 130, thus adjusting the contact pressure of the secondary transfer belt 133 against the intermediate transfer belt 130 at the secondary transfer nip.

According to the present embodiment, the printer engine 100 executes control to correct an error in image magnification in the sub-scanning direction (i.e., image magnification in the sheet conveying direction) caused by a difference in the toner adhesion amount information relating to the amount of toner adhering per unit area of an image that is formed on a recording medium. Specifically, the error in the magnification in the sub-scanning direction is caused by an error in conveyance speed of the sheet P at the secondary transfer nip due to the difference in the toner adhesion amount information. To address such a situation, the printer engine 100 of the present embodiment acquires the toner adhesion amount information on an image that is formed on a recording medium and uses a correction value corresponding to the acquired toner adhesion amount information to adjust, with the adjuster described above (i.e., the motor 134c), the conveyance speed of the recording medium when the image is secondarily transferred. Accordingly, the image having a magnification in the sub-scanning direction corrected is secondarily transferred onto the sheet P.

In the following description, the toner adhesion amount information relating to the amount of toner adhering per unit area of an image that is formed on a recording medium is information relating to the image area rate of the image that is formed on the recording medium. The "image area rate" is a sum of rates of an image portion (i.e., a portion to which a toner image adheres) per unit area on the sheet P calculated for each color of toner. Specifically, in a case in which the sheet P is blank and no image is formed, the image area rate is 0%. In a case in which a single solid image is formed on the entire surface of the sheet P, the image area rate is 100%. In a case in which each of four solid images in different colors is formed on the entire surface of the sheet P, the image area rate is 400%.

Now, a description is given of a correction value calculating process performed by the correction value calculating unit 182 of the control unit 180 to calculate a correction value that is used to correct the number of rotations of the drive roller 134a that rotates the secondary transfer belt 133, to correct the magnification in the sub-scanning direction.

Figure 6A:
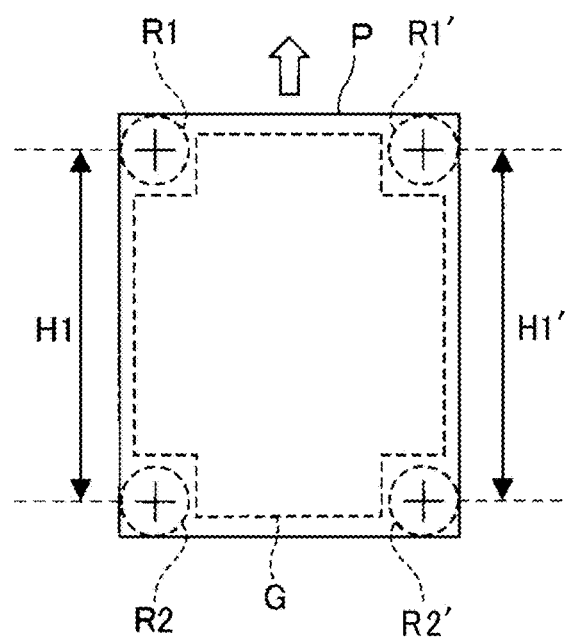
FIG. 6A is a diagram illustrating a pattern image that is used in a correction value calculating process.
Figure 6B:
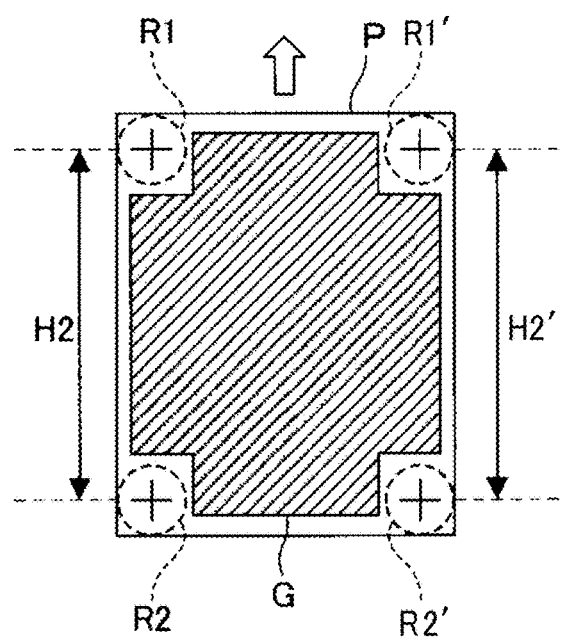
FIG. 6B is a diagram illustrating another pattern image that is used in a correction value calculating process.

FIG. 6A is a diagram illustrating a pattern image that is used in the correction value calculating process. FIG. 6B is a diagram illustrating another pattern image that is used in the correction value calculating process.

As illustrated in FIGS. 6A and 6B, each of the pattern images that are used in the correction value calculating process of the present embodiment includes detection marks R1, R2, R1', and R2' that are formed at different positions (near the four corners of the sheet P). Specifically, the detection marks R1 and R2 are formed at different positions in the sheet conveying direction (i.e., sub-scanning direction). Similarly, the detection marks R1' and R2' are formed at different positions in the sheet conveying direction (i.e., sub-scanning direction). In addition to the detection marks R1, R2, R1', and R2', as illustrated in FIG. 6B, the pattern image includes an image portion G, which is formed on substantially the entire surface of the sheet P except for the detection marks R1, R2, R1', and R2. The image portion G is used to change the image area rate. The pattern image including the detection marks R1, R2, R1', and R2' and the image portion G is secondarily transferred onto the sheet P at the secondary transfer nip.

Figure 7:
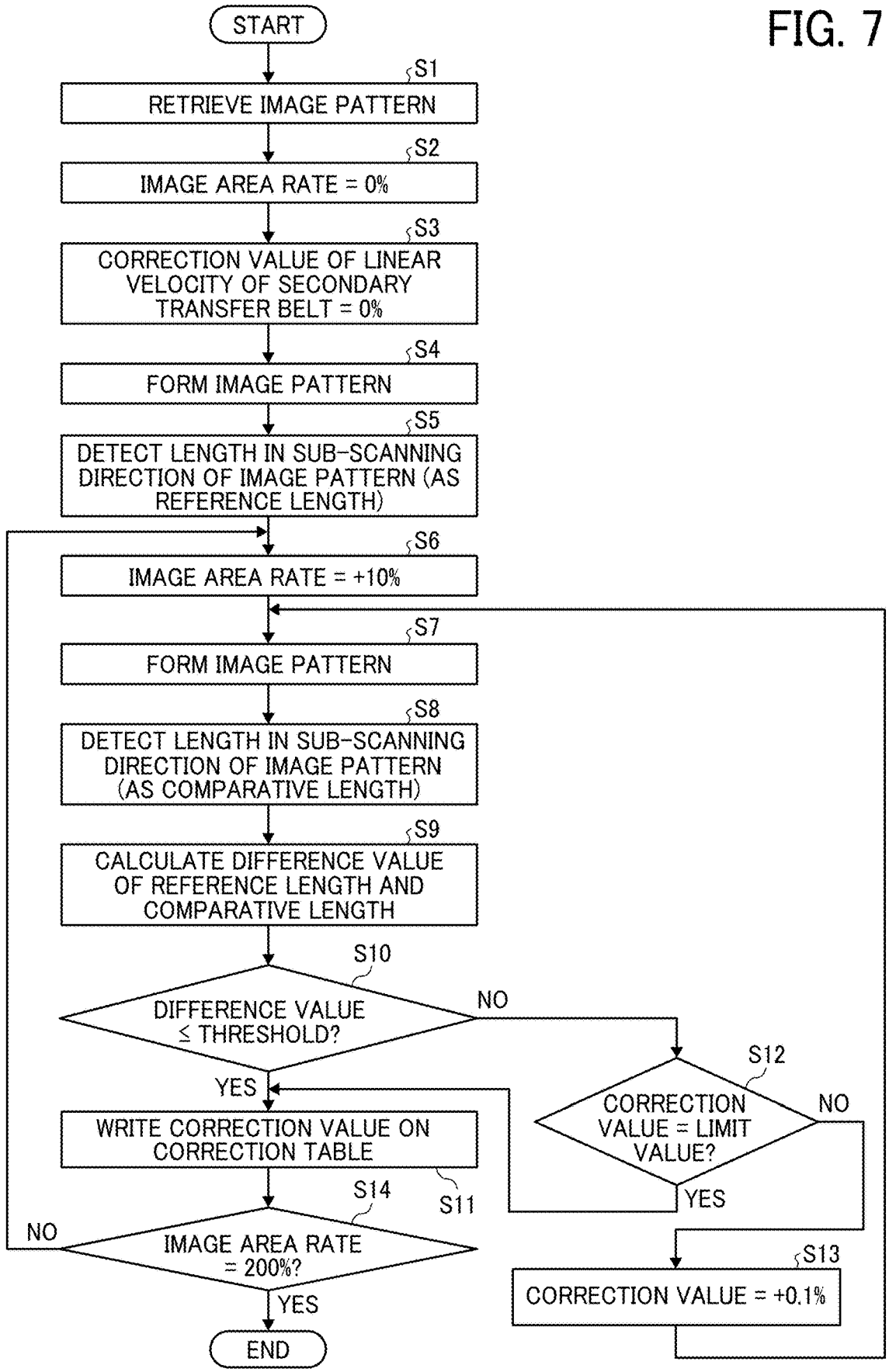
FIG. 7 is a flowchart of a correction value calculating process according to an embodiment of the present disclosure.

FIG. 7 is a flowchart of the correction value calculating process according to the present embodiment.

In step S1, the correction value calculating unit 182 of the control unit 180 retrieves, from the pattern storing unit 212 of the storing unit 210, an image pattern that is used in the correction value calculating process.

In step S2, the correction value calculating unit 182 sets the image area rate of the image portion G to 0%.

In step S3, the correction value calculating unit 182 sets the linear velocity of the secondary transfer belt 133 to an initial value (i.e., correction value=0%).

Thereafter, in step S4, the printer control unit 183 controls the image forming operation according to the setting described above to secondarily transfer the pattern image onto a sheet P, thus forming the image pattern on the sheet P. Specifically, as illustrated in FIG. 6A, the image pattern including the detection marks R1, R2, R1', and R2' near the four corners of the sheet P and the image portion G having an image area rate of 0% is formed on the sheet P.

Thereafter, the image density sensor 70 detects the pattern image formed on the sheet P'. In other words, the image density sensor 70 detects the pattern image after the pattern image is fixed onto the sheet P. In step S5, the correction value calculating unit 182 detects or calculates, as a reference length, the length in the sub-scanning direction of the pattern image detected by the image density sensor 70.

Note that the length in the sub-scanning direction of a pattern image detected in the present embodiment is a mean value of a distance H1 (or H2) in the sub-scanning direction between the detection marks R1 and R2 in the pattern image and a distance H1' (or H2') in the sub-scanning direction between the detection marks R1' and R2' in the pattern image. However, the length in the sub-scanning direction of a pattern image detected in the present embodiment is not limited to such a mean value.

In step S6, the correction value calculating unit 182 increases the image area rate of the image portion G by 10%. In short, the correction value calculating unit 182 sets the image area rate of the image portion G to 10%.

In step S7, the printer control unit 183 controls the image forming operation with the currently set correction value of the linear velocity of the secondary transfer belt 133, to form a pattern image having an image area rate of 10% on a sheet P.

Thereafter, the image density sensor 70 detects the pattern image formed on the sheet P'. In other words, the image density sensor 70 detects the pattern image after the pattern image is fixed onto the sheet P. In step S8, the correction value calculating unit 182 detects or calculates, as a comparative length, the length in the sub-scanning direction of the pattern image detected by the image density sensor 70.

In step S9, the correction value calculating unit 182 compares the reference length (i.e., the length in the sub-scanning direction of the pattern image having an image area rate of 0%) with the comparative length (i.e., the length in the sub-scanning direction of the pattern image having an image area rate of 10%), to calculate a comparison value (referred to as a difference value in the present example) of the reference length and the comparative length.

In step S10, the correction value calculating unit 182 determines whether the difference value is equal to or less than a given threshold.

The threshold corresponds to an allowable upper limit value of a difference in length in the sub-scanning direction between a reference image (i.e., a pattern image having an image area rate of 0%) and a comparison target image (i.e., a pattern image having an image area rate of 10% in the present example). The threshold is set according to an allowance of error in magnification in the sub-scanning direction of an image formed on a recording medium. For example, in the case of an image formed on a recording medium of A3 size, the threshold is set to about 0.2 mm. In a case in which the threshold is a fixed value and the length in the sub-scanning direction of an image formed on a recording medium having a size other than A3 is detected, in steps S5 and S8, the correction value calculating unit 182 converts the length in the sub-scanning direction of the image formed on the recording medium having a size other than A3 into the length in the sub-scanning direction of the image formed on the recording medium of A3 size, thus calculating or detecting the length in the sub-scanning direction of the image. By contrast, in a case in which the threshold is a variable value, the threshold may be changed depending on the size of the recording medium bearing the pattern image.

When the correction value calculating unit 182 determines that the difference value is equal to or less than the threshold (Yes in step S10), in step S11, the correction value calculating unit 182 writes the correlation between the currently set image area rate (i.e., 10% in the present example) and the currently set correction value (i.e., 0% in the present example) on the correction table stored in the correction value storing unit 211.

By contrast, when the correction value calculating unit 182 determines that the difference value is greater than the threshold (No in step S10), in step S12, the correction value calculating unit 182 determines whether the currently set correction value has reached a limit value. The limit value is determined based on, e.g., a set limit value of the number of rotations of the motor 134c that drives and rotates the secondary transfer belt 133 or a limit value according to the image forming conditions.

When the currently set correction value has reached the limit value (Yes in step S12), in step S11, the correction value calculating unit 182 writes the correlation between the currently set image area rate and the currently set correction value (i.e., the limit value) on the correction table stored in the correction value storing unit 211.

By contrast, when the currently set correction value has not reached the limit value (No in step S12), in step S13, the correction value calculating unit 182 increases the correction value by 0.1%. In short, the correction value calculating unit 182 sets the correction value to 0.1% in the present example.

Thereafter, the process returns to step S7, in which the printer control unit 183 controls the image forming operation with the currently set correction value of the linear velocity of the secondary transfer belt 133, to form the pattern image having an image area rate of 10% again. Thereafter, the image density sensor 70 detects the pattern image. In step S8, the correction value calculating unit 182 detects or calculates, as a reference length, the length in the sub-scanning direction of the pattern image detected by the image density sensor 70. In step S9, the correction value calculating unit 182 compares the reference length with the comparative length to calculate the difference value. In step S10, the correction value calculating unit 182 determines whether the difference value is equal to or less than the given threshold.

When the correction value calculating unit 182 determines that the difference value is equal to or less than the threshold (Yes in step S10), in step S11, the correction value calculating unit 182 writes the correlation between the currently set image area rate (i.e., 10% in the present example) and the currently set correction value (i.e., 0.1% in the present example) on the correction table stored in the correction value storing unit 211.

After writing the correlation on the correction table stored in the correction value storing unit 211 in step S11, in step S14, the correction value calculating unit 182 determines whether the image area rate has reached 200%. When the image area rate has not reached 200% yet (No in step S14), the process returns to step S6, in which the correction value calculating unit 182 increases the image area rate of the image portion G by 10%. In short, the correction value calculating unit 182 sets the image area rate of the image portion G to 20%. With the image area rate of 20%, the subsequent operations (in steps S7 to S13) are executed as described above. Such operations are repeated until the image area rate is set to 200% (Yes in step S14). Thus, in the present process, the correction values corresponding to image area rates per 10% from 0% to 200% are acquired. Accordingly, a correction table indicating such a correlation between the image area rate and the correction value is generated in the correction value storing unit 211 of the storing unit 210.

The correction value calculating process as described above is performed when the image forming apparatus 1 is powered or immediately before continuous image forming operations are performed, for example. Accordingly, in an image forming operation after the correction value calculating process is executed, the printer control unit 183 acquires the image area rate of an image from input image data and retrieves a correction value corresponding to the acquired image area rate from the correction table stored in the correction value storing unit 211. With the retrieved correction value, the printer control unit 183 controls the number of rotations of the motor 134c to control the number of rotations of the drive roller 134a. As a result, the rotational speed (i.e., linear velocity) of the secondary transfer belt 133 is controlled. Accordingly, the difference in linear velocity between the secondary transfer belt 133 and the intermediate transfer belt 130 (i.e., the linear velocity of the secondary transfer belt 133 relative to the intermediate transfer belt 130) at the secondary transfer nip is adjusted as appropriate to correct the deviation in the conveyance speed of the sheet P at the secondary transfer nip and the error in magnification in the sub-scanning direction of an image that is formed on the sheet P.

During the period from the execution of the correction value calculating process described above to the execution of the next correction value calculating process, some changes may occur, such as the environmental changes such as temperature and humidity changes and over-time changes of the surface conditions of the image bearer and the transfer rotator or the conditions of the recording media. Such changes may vary the optimum correction value corresponding to the image area rate of an image that is formed on a recording medium. As a result, the error in magnification in the sub-scanning direction may not be reduced as appropriate and may deviate from an allowance.

To address such a situation, in the present embodiment, the image density sensor 70 detects the length in the sub-scanning direction of an image (e.g., user image) formed on a recording medium during the period from the execution of the correction value calculating process to the execution of the next correction value calculating process. The correction value correcting unit 181 corrects a correction value based on the detected length in the sub-scanning direction and a target length.

Figure 8:
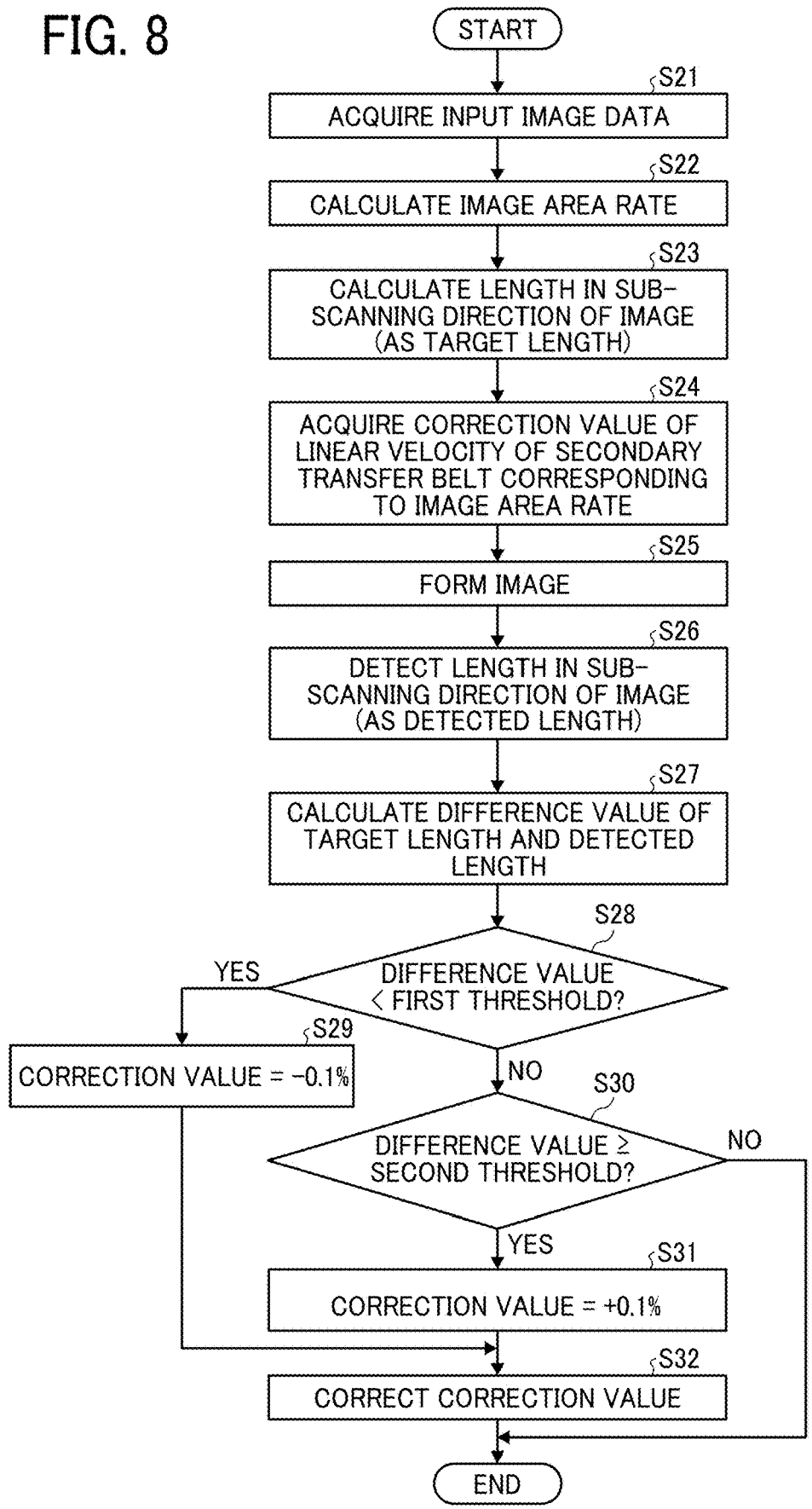
FIG. 8 is a flowchart of a correction value correcting process according to an embodiment of the present disclosure.

Referring now to FIG. 8, a description is given of a correction value correcting process for correcting the correction values in the correction table stored in the correction value storing unit 211 of the storing unit 210 according to the present embodiment.

In the present embodiment, the correction value correcting process is executed for each input image data (i.e., for each recording medium). However, the correction value correcting process may be executed at an appropriate time. For example, the correction value correcting process may be executed per specified multiple numbers of recording media or when a temperature sensor detects a temperature changing from the temperature detected at the time of the previous correction value calculating process and exceeding a specified temperature.

FIG. 8 is a flowchart of the correction value correcting process according to the present embodiment.

In step S21, the correction value correcting unit 181 of the control unit 180 acquires image data that is input to the image forming apparatus 1 in response to a print instruction from a user. In step S22, the correction value correcting unit 181 calculates, from the acquired image data, an image area rate (i.e., toner adhesion amount information) at which an image of the image data is formed on the sheet P. In step S23, the correction value correcting unit 181 calculates a target length from the acquired image data. The target length is the length in the sub-scanning direction of the image of the image data when the image is formed on the sheet P according to the acquired image data.

In step S24, the printer control unit 183 of the control unit 180 acquires the correction value corresponding to the image area rate calculated in step S22 from the correction table stored in the correction value storing unit 211 of the storing unit 210.

In step S25, with the acquired correction value, the printer control unit 183 controls the number of rotations of the motor 134c to control the rotational speed (i.e., linear velocity) of the secondary transfer belt 133, thus forming an image according to the image data. As a result, with the correction value stored in the correction value storing unit 211, the deviation of the conveyance speed of the sheet P at the secondary transfer nip is corrected while the error in magnification in the sub-scanning direction of the image that is formed on the sheet P is corrected.

In the present embodiment, the correction table presents correction values corresponding to image area rates per 10% from 0% to 200%. When the image area rate calculated in step S22 does not completely match one of the image area rates per 10% presented in the correction table, the correction value corresponding to the image area rate matching the calculated image area rate does not exist in the correction table in a precise sense.

In such a case, for example, the correction value correcting unit 181 may round off the image area rate calculated in step S22 to one of the image area rates per 10% and retrieve the correction value corresponding to the calculated image area rate from the correction table. In a specific example, when the calculated image area rate is 18%, the correction value correcting unit 181 rounds off the image area rate to 20% and retrieves the correction value corresponding to the image area rate of 20% from the correction table.

Alternatively, for example, the correction value correcting unit 181 may use the correction values (i.e., correction values corresponding to the image area rates per 10%) presented in the correction table to calculate a correction value corresponding to the calculated image area rate. In a specific example, when the calculated image area rate is 18%, the correction value correcting unit 181 may perform linear interpolation between two correction values corresponding to two image area rates above and below the image area rate of 18% (i.e., a correction value corresponding to the image area rate of 10% and a correction value corresponding to the image area rate of 20%) presented in the correction table, to calculate a correction value corresponding to the image area rate of 18%.

Thereafter, the image density sensor 70 detects the image formed on the sheet P'. In other words, the image density sensor 70 detects the image formed on the sheet P according to the image data after the image is fixed onto the sheet P. In step S26, the correction value correcting unit 181 detects or calculates, as a detected length, the length in the sub-scanning direction of the image detected by the image density sensor 70. The detected length may be a distance in the sub-scanning direction between two points like the two points on the image data from which the target length is calculated as described above. Specifically, the two points may be the first dot and the last dot in the sub-scanning direction of the image. Alternatively, the two points may be two pattern images formed at given positions in the image.

In step S27, the correction value correcting unit 181 compares the target length calculated in step S23 with the detected length detected in step S26, to calculate a comparison value. In the present example, the comparison value is a difference value (i.e., error in magnification in the sub-scanning direction) obtained by subtracting the detected length from the target length.

In steps S28 and S30, the correction value correcting unit 181 determines whether the difference value is within a given allowance. When the difference value is within the allowance (No in steps S28 and S30), the correction value correcting process ends without correcting a correction value in the current correction table. By contrast, when the correction value correcting unit 181 determines that the difference value is outside the given allowance, the correction value correcting unit 181 corrects a correction value in the current correction table.

Specifically, in step S28, the correction value correcting unit 181 determines whether the difference value is less than a first threshold (e.g., −0.2 mm). Note that the first threshold is a lower limit of the given allowance. When the correction value correcting unit 181 determines that the difference value is less than the first threshold (Yes in step S28), in step S29, the correction value correcting unit 181 decreases the correction value retrieved in step S24 by 0.1%, thus correcting the correction value. Since the difference value obtained by subtracting the detected length from the target length is a negative value, the detected length is greater than the target length. In other words, the image is enlarged in the sub-scanning direction. To address such a situation, the linear velocity of the secondary transfer belt 133 is to be decreased to decrease the conveyance speed of the sheet P at the secondary transfer nip and reduce the image size in the sub-scanning direction. In other words, the correction value is to be decreased in step S29. In the present example, the correction value correcting unit 181 decreases the correction value by 0.1%, thus correcting the correction value.

By contrast, when the correction value correcting unit 181 determines that the difference value is not less than the first threshold (No in step S28), in step S30, the correction value correcting unit 181 determines whether the difference value is equal to or greater than a second threshold (e.g., +0.2 mm). Note that the second threshold is an upper limit of the given allowance. When the correction value correcting unit 181 determines that the difference value is equal to or greater than the second threshold (Yes in step S30), in step S31, the correction value correcting unit 181 increases the correction value retrieved in step S24 by 0.1%, thus correcting the correction value. Since the difference value obtained by subtracting the detected length from the target length is a positive value, the detected length is smaller than the target length. In other words, the image size is reduced in the sub-scanning direction. To address such a situation, the linear velocity of the secondary transfer belt 133 is to be increased to increase the conveyance speed of the sheet P at the secondary transfer nip and enlarge the image in the sub-scanning direction. In other words, the correction value is to be increased in step S31. In the present example, the correction value correcting unit 181 increases the correction value by 0.1%, thus correcting the correction value.

As described above, in step S32, the correction value correcting unit 181 corrects the correction value corresponding to the image area rate of the current image data in the correction table. Use of the correction value thus corrected keeps the error in magnification in the sub-scanning direction within the allowance in the subsequent image forming operations. Although the correction value correcting unit 181 corrects only the correction value corresponding to the image area rate of the current image data in the correction table in the present example, the correction value correcting unit 181 may also correct other correction values in conjunction with the corrected correction value.

In a case in which the printer control unit 183 uses calculation information, instead of the correction table, to acquire the correction value corresponding to the toner adhesion amount information (i.e., image area rate) of an image that is formed on a recording medium, the correction value correcting unit 181 may correct the calculation information (e.g., coefficients of calculation formula) in the correction value correcting process.

In the present embodiment, the correction value calculating process for generating the correction table is performed when the image forming apparatus 1 is powered or immediately before continuous image forming operations are performed, for example. Alternatively, the correction value calculation process may be performed at a given time during the continuous image forming operations. In the present embodiment, even during the continuous image forming operations, the correction value correcting process is executable, without interrupting the image forming operations, to correct the correction value in the correction table as appropriate. However, when a large number of images are continuously formed, the image forming operations may be interrupted. In such a case, the correction value calculating process including image forming operations of pattern images may be executed to regenerate the correction table. In this case, the error in magnification in the sub-scanning direction may be more appropriately corrected in the remaining image forming operations.

Although specific embodiments are described, the embodiments according to the present disclosure are not limited to those specifically described herein. Several aspects of the image forming apparatus are exemplified as follows.

Initially, a description is given of a first aspect.

According to the first aspect, an image forming apparatus (e.g., image forming apparatus 1) includes a rotatable image bearer (e.g., intermediate transfer belt 130), a transfer rotator (e.g., secondary transfer belt 133). While a recording medium (e.g., sheet P or P') is sandwiched and conveyed between the image bearer and the transfer rotator, a toner image is transferred from the image bearer onto the recording medium. Thus, the image forming apparatus forms an image on the recording medium. The image forming apparatus further includes a detector (e.g., the image density sensor 70 or the length detecting unit 190) that detects length information indicating a length in the direction of conveyance of the recording medium (i.e., length in the sub-scanning direction) of the image on the recording medium. The image forming apparatus further includes circuitry. The circuitry (e.g., correction value correcting unit 181) corrects a correction value, based on the length information detected by the detector and a target value of the length information, to correct an image magnification in a direction of conveyance of the recording medium (e.g., magnification in the sub-scanning direction) of the image to be formed on the recording medium. The circuitry (e.g., printer control unit 183) controls an image forming operation of forming the image on the recording medium with the correction value.

At the transfer nip between the image bearer and the transfer rotator, the toner image is transferred onto the recording medium conveyed. Since an unfixed toner image exists between the image bearer and the recording medium, a frictional force between the image bearer and the recording medium changes depending on the amount of toner per unit area of the toner image (i.e., the amount of toner adhering per unit area of the image that is formed on the recording medium). Such a change of the frictional force further changes the conveyance speed of the recording medium at the transfer nip. As a result, the image expands or shrinks in the direction of conveyance of the recording medium and thus formed on the recording medium. In other words, the image is formed with an error in magnification in the direction of conveyance of the recording medium.

In the embodiments of the present disclosure, an operation of forming an image on a recording medium is controlled with the correction value that is used to correct the image magnification in the direction of conveyance of the recording medium of the image to be formed on the recording medium. The correction value is, e.g., a correction value corresponding to the toner adhesion amount information relating to the amount of toner adhering per unit area of the image that is formed on the recording medium. With the correction value, the image forming apparatus of the embodiments of the present disclosure reduces the error in image magnification in the direction of conveyance of the recording medium attributed to the amount of toner adhering per unit area of the image that is formed on the recording medium.

However, an optimum correction value corresponding to the toner adhesion amount information may change due to the environmental changes such as temperature and humidity changes or over-time changes of the surface conditions of the image bearer and the transfer rotator or the conditions of the recording media. As a result, the error in image magnification in the direction of conveyance of the recording medium may not be reduced as appropriate.

To address such a situation, the detector of the image forming apparatus detects the length information of the length in the direction of conveyance of the recording medium of the image on the recording medium. The circuitry (e.g., correction value correcting unit 181) corrects the correction value, based on the detected length information and the target value of the length information. Accordingly, even in a situation in which the environmental changes or over-time changes as described above hamper correction of the error in image magnification in the direction of conveyance of the recording medium within an allowance with an initial correction value (i.e., correction value before correction), the correction value is corrected to correct the error within the allowance. As a result, in the subsequent image formation, the image forming operation is controlled with the corrected correction value. Accordingly, the error in the image magnification in the direction of conveyance of the recording medium is corrected within the allowance.

Now, a description is given of a second aspect.

According to the second aspect, in the image forming apparatus of the first aspect, the circuitry (e.g., the correction value correcting unit 181) calculates the target value of the length information from image data of the image corresponding to the length information detected by the detector.

The target value of the length information is acquirable when another detector detects length information of the image before being transferred onto the recording medium, in other words, length information of the image on the image bearer corresponding to the length information detected by the detector.

According to the present aspect, since the circuitry calculates the target value of the length information from the image data, providing the other detector is omittable.

Now, a description is given of a third aspect.

According to the third aspect, in the image forming apparatus of the first or second aspect, the circuitry (e.g., printer control unit 183) controls, with the correction value, at least one of a difference in rotational speed (e.g., a difference in linear velocity) between the image bearer and the transfer rotator and a contact pressure between the image bearer and the transfer rotator.

The circuitry (e.g., printer control unit 183) controls at least one of the difference in rotational speed and the contact pressure and adjusts the conveyance speed of the recording medium at the transfer nip, to correct the magnification in the direction of conveyance of the recording medium of the image on the recording medium.

Now, a description is given of a fourth aspect.

According to the fourth aspect, in the image forming apparatus of any one of the first to third aspects, the correction value corresponds to the toner adhesion amount information relating to the amount of toner adhering per unit area.

Accordingly, the image forming apparatus reduces the error in image magnification in the direction of conveyance of the recording medium attributed to the amount of toner adhering per unit area of the image that is formed on the recording medium.

Now, a description is given of a fifth aspect.

According to the fifth aspect, in the image forming apparatus of the fourth aspect, the toner adhesion amount information includes image area rate information acquirable from image data of the image.

Accordingly, the toner adhesion amount information is easily and quickly acquired.

Now, a description is given of a sixth aspect.

According to the fifth aspect, the image forming apparatus of the fourth or fifth aspect further includes a storage device (e.g., the ROM 20, the HDD 40, or the correction value storing unit 211) that stores table information (e.g., correction value table) including the toner adhesion amount information in association with the correction value. The circuitry (e.g., the correction value correcting unit 181) calculates, from image data of the image, the toner adhesion amount information. The circuitry (e.g., printer control unit 183) specifies, from the table information, the correction value corresponding to the calculated toner adhesion amount information. The circuitry (e.g., printer control unit 183) controls, with the specified correction value, the image forming operation of forming the image on the recording medium. The circuitry (e.g., correction value correcting unit 181) corrects the table information.

Accordingly, a simple process with the table information attains correction of the magnification in the direction of conveyance of the recording medium of the image on the recording medium.

Now, a description is given of a seventh aspect.

According to the seventh aspect, in the image forming apparatus of the sixth aspect, in a case in which the table information includes no correction value corresponding to the calculated toner adhesion amount information, the circuitry (e.g., printer control unit 183) calculates, with the correction value presented in the table information, the correction value corresponding to the calculated toner adhesion amount information.

Accordingly, even when the table information includes no correction value corresponding to the calculated toner adhesion amount information, the error in the image magnification in the direction of conveyance of the recording medium is reduced with the correction value calculated from the correction value included in the table information.

Now, a description is given of an eighth aspect.

According to the eighth aspect, the image forming apparatus of the fourth or fifth aspect further includes a storage device (e.g., the ROM 20, the HDD 40, or the storing unit 210) that stores calculation information (e.g., information of a calculation formula) to calculate the correction value from the toner adhesion amount information. The circuitry (e.g., the correction value correcting unit 181) calculates, from image data of the image, the toner adhesion amount information. The circuitry (e.g., printer control unit 183) calculates, with the calculation information, the correction value corresponding to the calculated toner adhesion amount information. The circuitry (e.g., printer control unit 183) controls, with the calculated correction value, the image forming operation of forming the image on the recording medium. The circuitry (e.g., correction value correcting unit 181) corrects the calculation information.

Accordingly, without a correction table, the circuitry acquires the correction value corresponding to the calculated toner adhesion amount information, with the calculation information (e.g., a calculation formula such as a relational expression between the toner adhesion amount information and the correction value) that is used to calculate the correction value from the toner adhesion amount information. In short, with a less data amount, the circuitry acquires an appropriate correction value corresponding to the calculated toner adhesion amount information.

Now, a description is given of a ninth aspect.

According to the ninth aspect, in the image forming apparatus of any one of the first to eighth aspects, the detector (e.g., the image density sensor 70 or the length detecting unit 190) detects the length information indicating a length in the direction of conveyance of the recording medium of a pattern image formed on a recording medium during continuous image forming operations. The circuitry (e.g., the correction value calculating unit 182) calculates the correction value before being corrected, based on the toner adhesion amount information of the pattern image and the length information of the pattern image detected by the detector.

The present aspect allows, during continuous image forming operations, regeneration of the correction value before being corrected. Since the correction value is regenerated with the pattern image during continuous image forming operations, an appropriate correction value is acquirable even during continuous image forming operations.

Now, a description is given of a tenth aspect.

According to the tenth aspect, in the image forming apparatus of any one of the first to ninth aspects, the circuitry (e.g., correction value correcting unit 181) determines whether a comparative length of the length information detected by the detector and the target value of the length information is outside a given allowance. When the circuitry determines that the comparative length is outside the given allowance, the circuitry corrects the correction value. The circuitry (e.g., correction value correcting unit 181) changes the given allowance depending on the target value of the length information (e.g., target value for each recording medium size), to determine whether the comparative length is outside the changed allowance (e.g., the given allowance converted into an allowance according to the size of the recording medium). Alternatively, the circuitry (e.g., correction value correcting unit 181) changes the length information detected by the detector depending on the target value of the length information, to determine whether a comparative length of the changed length information (e.g., length information indicating the detected length converted into a length on a given recording medium size such as A3) and the target value of the length information is outside the given allowance.

In a case in which the size of the recording medium on which the image is formed changes, the length in the sub-scanning direction of the image that is formed on the recording medium changes. In other words, the target value of the length information of the image changes. According to the present aspect, the circuitry changes the allowance for each target value of the different length information. In other words, the circuitry uses the allowance converted for each target value of the different length information to determine whether to correct the correction value. According to the present aspect, the circuitry changes the length information detected by the detector for each target value of the different length information. In other words, the circuitry uses the length information detected by the detector and converted for each target value of the different length information to determine whether to correct the correction value. Accordingly, even when the length in the sub-scanning direction of the image that is formed on the recording medium changes, in other words, even when the target value of the length information of the image changes, the circuitry determines whether to correct the correction value as appropriate.

Accordingly, the embodiments of the present disclosure attain correction of an error in image size (or image magnification) in the direction of conveyance of a recording medium of an image formed on the recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus comprising:
a rotatable image bearer to bear an image;
a transfer rotator to transfer the image from the image bearer onto a recording medium sandwiched and conveyed between the image bearer and the transfer rotator;
an image density sensor to detect length information indicating a length, in a direction of conveyance of the recording medium, of the image on the recording medium; and
circuitry configured to:
correct a correction value, based on the length information detected by the image density sensor and a target value of the length information, to correct an image magnification, in the direction of conveyance of the recording medium, of an image to be formed on the recording medium;
control an image forming operation of forming the image to be formed on the recording medium with the correction value;
determine whether a comparative length of the length information detected by the image density sensor and the target value of the length information is outside a given allowance; and
correct the correction value in response to the comparative length being outside the given allowance,
wherein the circuitry is further configured to change:
the given allowance depending on the target value of the length information, to determine whether the comparative length is outside the changed allowance; or
the length information detected by the image density sensor depending on the target value of the length information, to determine whether a comparative length of the changed length information and the target value of the length information is outside the given allowance.

2. The image forming apparatus according to claim 1, wherein the circuitry is configured to calculate the target value of the length information from image data of the image corresponding to the length information detected by the image density sensor.

3. The image forming apparatus according to claim 1, wherein the circuitry is configured to control, with the correction value, at least one of a difference in rotational speed between the image bearer and the transfer rotator and a contact pressure between the image bearer and the transfer rotator.

4. The image forming apparatus according to claim 1, wherein the correction value corresponds to toner adhesion amount information relating to an amount of toner adhering per unit area.

5. The image forming apparatus according to claim 4, wherein the toner adhesion amount information includes image area rate information acquirable from image data of the image.

6. The image forming apparatus according to claim 4, further comprising a memory to store table information including the toner adhesion amount information in association with the correction value,
wherein the circuitry is configured to:
calculate, from image data of the image, the toner adhesion amount information;
specify, from the table information, the correction value corresponding to the calculated toner adhesion amount information;
control, with the specified correction value, the image forming operation of forming the image on the recording medium; and
correct the table information.

7. The image forming apparatus according to claim 6, wherein the circuitry is configured to calculate, with the correction value presented in the table information, the correction value corresponding to the calculated toner adhesion amount information, in response to the table information including no correction value corresponding to the calculated toner adhesion amount information.

8. The image forming apparatus according to claim 4, further comprising a memory to store calculation information to calculate the correction value from the toner adhesion amount information,
wherein the circuitry is configured to:
calculate, from image data of the image, the toner adhesion amount information;
calculate, with the calculation information, the correction value corresponding to the calculated toner adhesion amount information;
control, with the calculated correction value, the image forming operation of forming the image on the recording medium; and
correct the calculation information.

9. The image forming apparatus according to claim 1, wherein the image density sensor is further to detect the length information indicating a length in the direction of conveyance of the recording medium of a pattern image formed on the recording medium during continuous image forming operations,
wherein the circuitry is configured to calculate the correction value before being corrected, based on toner adhesion amount information of the pattern image and the length information of the pattern image detected by the image density sensor, and
wherein the toner adhesion amount information relates to an amount of toner adhering per unit area.

10. An image forming apparatus comprising:
a rotatable image bearer to bear an image;
a transfer rotator to transfer the image from the image bearer onto a recording medium sandwiched and conveyed between the image bearer and the transfer rotator;
means for detecting length information indicating a length, in a direction of conveyance of the recording medium, of the image on the recording medium;
means for correcting a correction value, based on the length information detected by the means for detecting and a target value of the length information, to correct an image magnification, in the direction of conveyance of the recording medium, of an image to be formed on the recording medium;
means for controlling an image forming operation of forming the image to be formed on the recording medium with the correction value;
means for determining whether a comparative length of the length information detected by the means for detecting length information and the target value of the length information is outside a given allowance;
means for correcting the correction value in response to the comparative length being outside the given allowance; and means for changing the given allowance depending on the target value of the length information, to determine whether the comparative length is outside the changed allowance, or for changing the length information detected by the means for detecting depending on the target value of the length information, to determine whether a comparative length of the changed length information and the target value of the length information is outside the given allowance.

11. A method of forming an image, comprising:

detecting a length of an image which is on a recording medium;

correcting a correction value, based on the length detected by the detecting and a target value of the length, to correct an image magnification, in a direction of conveyance of the recording medium, of an image to be formed on the recording medium;

control an image forming operation of forming the image to be formed on the recording medium with the correction value;

determining whether a comparative length of the length information detected by the detecting and the target value of the length information is outside a given allowance;

correcting the correction value in response to the comparative length being outside the given allowance; and changing the given allowance depending on the target value of the length information, to determine whether the comparative length is outside the changed allowance, or for changing the length information detected by the means for detecting depending on the target value of the length information, to determine whether a comparative length of the changed length information and the target value of the length information is outside the given allowance.

* * * * *